Feb. 17, 1970   F. L. ZROSTLIK   3,495,767
AIR COMPRESSOR SYSTEM
Filed Nov. 6, 1967   2 Sheets-Sheet 1

INVENTOR.
FRANCIS L. ZROSTLIK
BY Hofgren, Wegner,
Allen, Stellman
McCord.
ATTORNEYS.

Feb. 17, 1970  F. L. ZROSTLIK  3,495,767
AIR COMPRESSOR SYSTEM
Filed Nov. 6, 1967  2 Sheets-Sheet 2
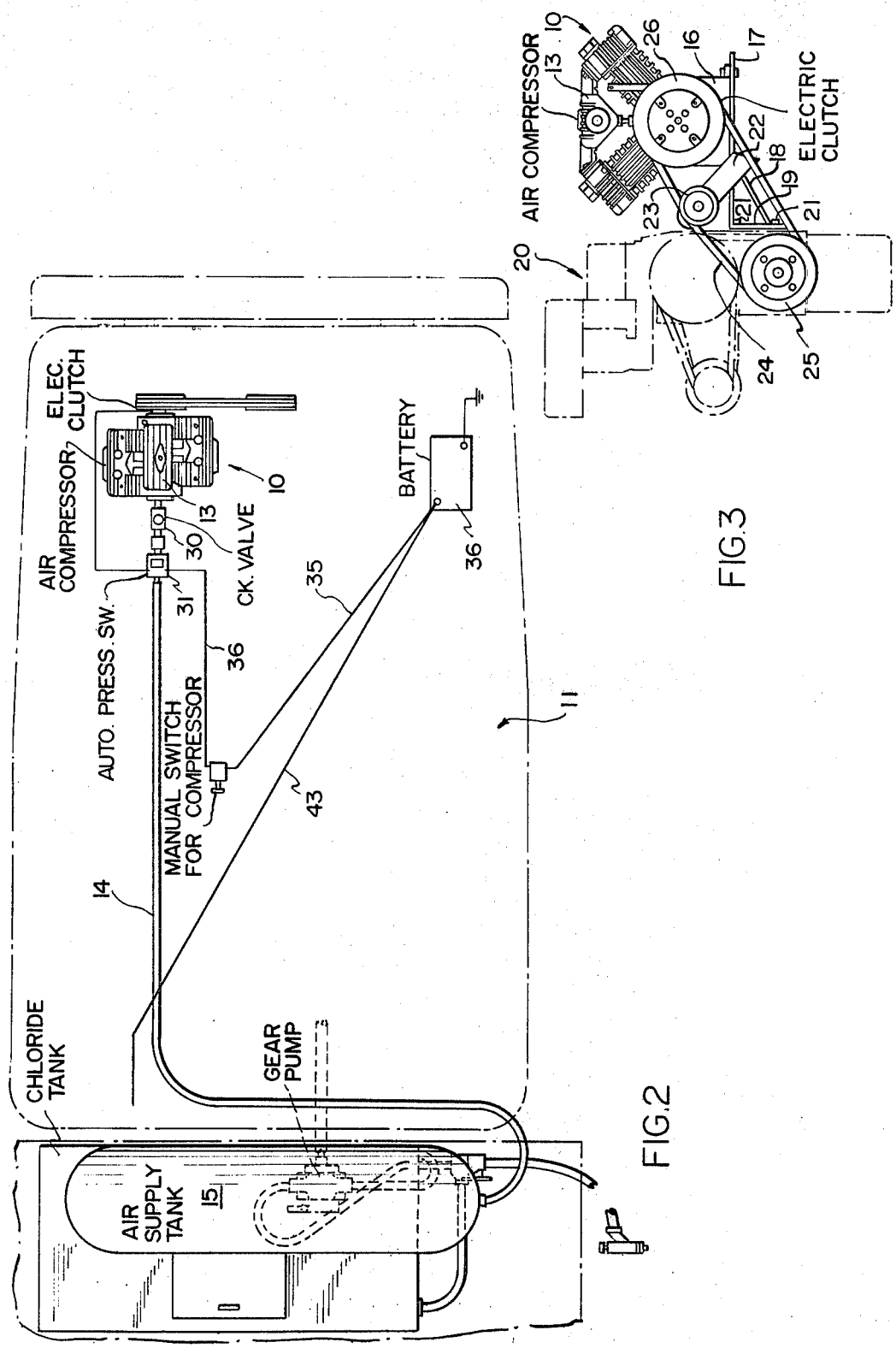

United States Patent Office 3,495,767
Patented Feb. 17, 1970

3,495,767
AIR COMPRESSOR SYSTEM
Francis L. Zrostlik, Garner, Iowa, assignor to Iowa Mold Tooling Co., Inc., a corporation of Iowa
Filed Nov. 6, 1967, Ser. No. 680,770
Int. Cl. F04b 49/02
U.S. Cl. 230—15          7 Claims

ABSTRACT OF THE DISCLOSURE

An air compressor system for a pick-up size truck incorporating an electric clutch equipped, single-stage compressor, capable of delivering at least 16 c.f.m. of free air at 100 p.s.i., mounted in the engine compartment of the truck without modification of the compartment and to be driven by belts from the engine at no more than 1,000 r.p.m. engine and compressor speeds with the system including a storage tank, a check valve immediately adjacent the compressor, a high and low pressure sensor controlling the electric clutch and a manual overriding switch to activate or deactivate the sensor control.

BACKGROUND OF THE INVENTION

This invention is concerned primarily with a service vehicle in the tire servicing industry for both industrial and farm equipment. In both areas, compressed air is needed in quantity and at pressures usable not only to inflate tires but to handle various air driven tools such as impact wrenches. In the past, a truck used for hauling large tires also hauled a compressor mounted upon a tank, in turn on skids; the compressor being equipped with a gasoline powered engine solely used to drive the compressor. The compresser was hauled in the truck as was any other bulk cargo. To provide the capacity of air at required pressures, generally a two-stage compressor was needed. Removing the lug nuts of a large truck wheel or a tractor wheel generally requires from 12 to 18 cubic feet per minute (c.f.m.) of free air at 100 p.s.i. to operate efficiently for the 10 to 15 minutes of time required to remove the lug nuts of a single wheel. It has been found that the storage tank obtaining air from the compressor has little effect upon the time/quantity requirements for operating such tools. The air compressor must provide the quantity and quality of compressed air needed.

SUMMARY OF THE INVENTION

It has been found that compressed air requirements for effective service operations can be provided by a novel arrangement of components in the system utilizing the truck engine as the power source. Specifically, a small 4-cylinder, single-stage compressor may be mounted on the truck engine inside the engine compartment without interfering with the normal operation of the truck. An electric clutch is belt-driven from the truck engine drive shaft in about a one-to-one ratio, so as to be operable at engine idle or fast idle speeds. A tank is provided; however, an automatic control, sensitive to high and low tank pressures, controls the electric clutch thereby maintaining a supply of air for use heretofore thought impossible to obtain. In the system, a manual control overrides all automatic controls, insuring that the system is inoperative during periods that the truck is used as a transporting vehicle. At the same time, the automatic controls insure an air supply with the truck engine idling while the driver is out of the cab performing tire servicing duties.

The air supply system of this invention is completely separate and distinct from the usual auxiliary power sources of a truck, such as the battery powered electrical system and power take-off shafts so that lifting cranes, and liquid pumps usable for handling calcium chloride solution used in farm tractor tires, may be provided upon a service vehicle equipped with the air system of the present invention.

BRIEF DESCRIPTION OF THE DRAWINGS

FIGURE 2 is a view in plan of the part of the truck and system shown in FIGURE 1.

FIGURE 3 is a front elevational view of the compressor and its mounting relative to a 6-cylinder truck engine as shown in FIGURE 1.

DESCRIPTION OF THE PREFERRED EMBODIMENTS

Figure 1:
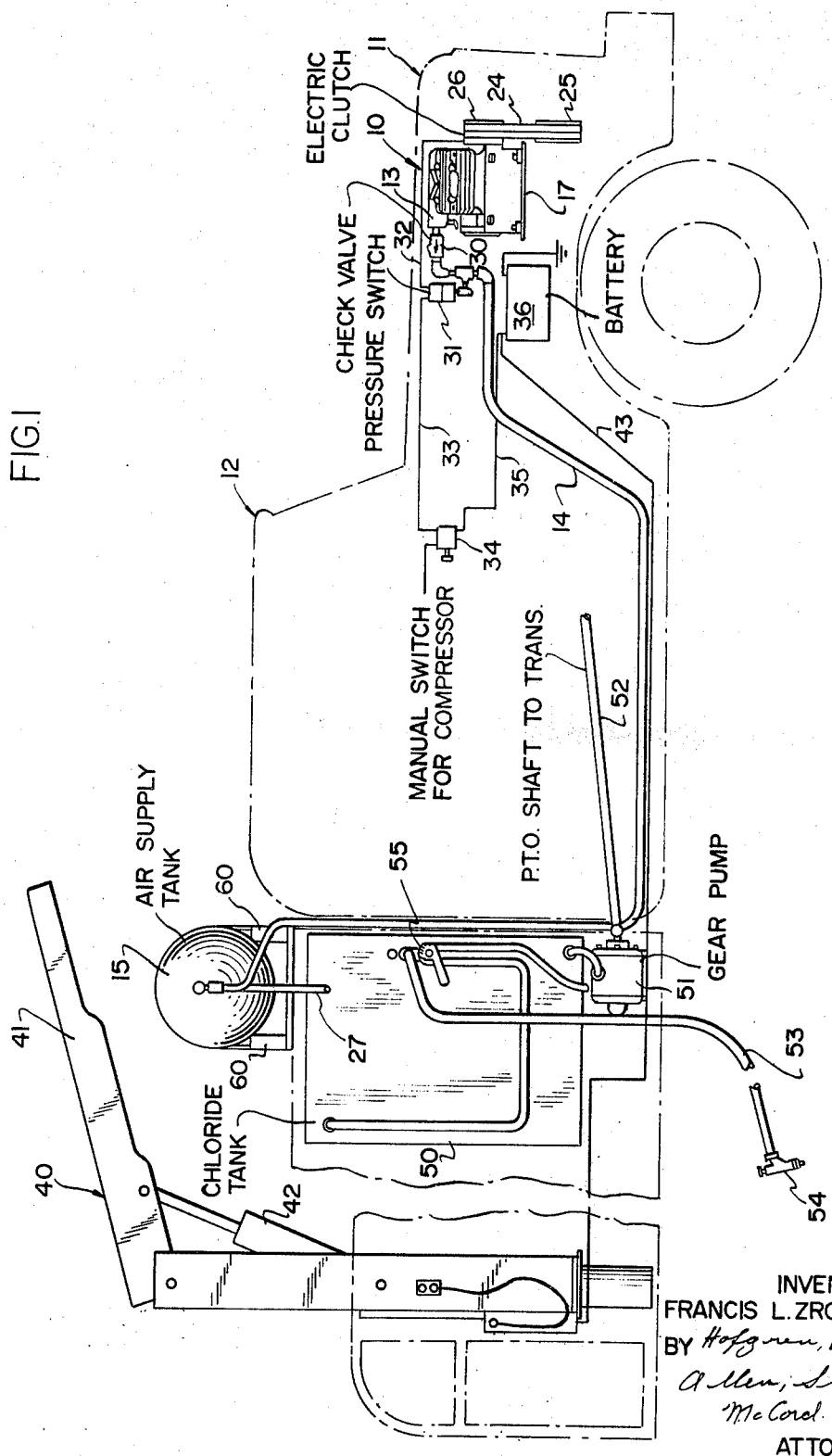
FIGURE 1 is a broken side elevational view of the components of the system of the present invention shown in approximate relative positions on a small truck vehicle shown in dotted outline.

The present air compressor system is intended to be installed in pick-up size trucks of popular makes, such as Ford, Chevrolet, Dodge, International Harvester and Jeep.

The truck is a tire servicing vehicle, and thus may be equipped with an electrically powered hydraulic crane for handling and lifting large tires and wheels of commercial vehicles and for farm tire servicing may also have a pump and tanks for handling the calcium chloride solutions which ballast farm tractor tires. Such solutions weigh approximately 10 pounds per gallon and many tractor tires will contain 80 or more gallons of ballast. The air compressor system provides free air for running various air tools as well as to inflate tires.

The air compressor of the present system is a single-stage, multi-cylinder compressor of small envelope. The compressor 10 is mounted within the engine compartment 11 of the pick-up truck ahead of the cab 12. It has been found that a 4-cylinder V-type compressor, having about a 2½-inch piston with a 2-inch stroke so that each cylinder has a 4.91 cubic inch displacement, will provide 25 cubic feet per minute displacement at 1,000 r.p.m., resulting in a usable 16 c.f.m. of free air at 100 p.s.i. The compressor itself is not over 12 inches high from the bottom of the compressor to its top manifold so that it can be mounted in an engine compartment without altering any of the configuration of the truck as produced by its manufacturer. Each cylinder of the compressor discharges through the usual type of wafer check valves into a common manifold 13 mounted between the cylinder banks. Air is drawn through an oppropriate line 14 from the compressor to the air supply tank 15 conveniently mounted to the rear of and above the truck cab 12. Mounting arms 60 secure the tank to the sides of the truck in a fixed position.

The compressor itself has a base 16 (FIGURE 3) mounted upon a bed plate 17 of a mounting platform. Arms 18 and 19 extend as a part of the platform over to the truck engine 20, in this instance shown as a 6-cylinder engine. A similar mounting is provided for V-8 engines and various sizes of 6-cylinder engines. The mounting platform is bolted as by bolts 21 to tapped holes in the block of the engine placed there by the manufacturer of the truck for reception of auxiliary devices. Each mounting platform will be tailored to the particular size of truck engine to which the compressor is to be mounted. The platform is also provided with an idler arm 22 equipped with an idler roller 23 in order to maintain taut a belt drive 24 from a pulley 25 behind the fan of the engine and on the drive shaft of the engine to an electric clutch pulley 26 on the shaft of the compressor.

It has been found that the efficiency of the compressor in arriving at a usable 16 c.f.m. of free air at 100 p.s.i. is enhanced by the placing of a check valve 30 in the line from the compressor to the storage tank immediately at the exit from the manifold 13. The controls of the compressor are automatic, brought about by a commercial pressure switch 31 connected into the line 14 immediately after the check valve on the tank side. The pressure control is of commercial type, sensitive to the pressure in the line and thus in the bank, and has a manually settable low pressure cut-in and a high pressure cut-out electrically controlling the electric clutch 26. For example, one control setting found desirable is to set the cut-in pressure at 110 p.s.i and the cut-out pressure at 130 p.s.i. The pressure switch 31 has electric leads 32 to the clutch and a branch 33 leading to a manually operated overriding switch 34 mounted in the cab of the truck and connected by lead 35 with the truck battery 36. The manual control is important in that the compressor should be operated at between 500 and 1,000 r.p.m. which is about truck engine idling speed. Thus, the system will be in operation only with the vehicle standing with the engine of the truck idling and not while the vehicle is in motion. The electric clutch is also a commercially available item as from Warner Electric Company and is equipped with pulleys of the size utilized on the truck engine so that the belts driving the compressor, together with the pulleys, provide about a one-to-one ratio between the engine drive shaft and the compressor shaft.

Air from the tank 15 may be piped, as by hose 27, to any desirable location on the truck body for connection of the tire filling air hoses or the connection of air tools. Quick-type connections are generally used for convenience. An important consideration is that the present system will provide sufficient air to operate impact wrenches for 10 to 15 minutes at efficient speeds and power in that the system will deliver a great deal of free air as specified. The V-system, single-stage compressor is readily mountable in all present day truck engine compartmets and its controls are simple and foolproof.

Referring to FIGURE 1, a lifting crane 40 is shown in position at the back of the truck, its outwardly extending arm 41 being operated by a hydraulic piston and cylinder device driven by an electric motor from the battery and electric system of the truck. A line 43 can connect the battery to the lifting crane quite independently of the air compressor system. While the truck engine is idling, its alternator replenishes the electrical storage system so that generally plenty of power is available for operating the lifting crane which is important to the handling of large tires and wheels.

For farm service, a tire servicing vehicle also needs to handle the calcium chloride solution. In the present vehicle the air compressor system does not occupy truck bed space, and therefore, a calcium chloride tank 50 may be mounted directly behind the cab of the truck and over a gear pump 51, receiving its power from power take-off shaft 52 in the truck engine. Hose 53 may be equipped with an appropriate nozzle 54 for withdrawing solution or replenishing solution in tractor tires. A jet pump 55 is utilized whereby the gear pump with appropriate piping can cause the calcium chloride solution to be pumped in either direction through the hose 53. Here also the system is independent of the air supply system so that a truck equipped with the latter may also conveniently be provided with the necessary auxiliaries for servicing farm tractor tires.

Once the system is installed on a truck, operating procedures conserve time of the tire servicing personnel since the truck at the start of a service call is usually moved to a location to be loaded with the necessary tires and wheels. While the truck is standing for loading, the idling engine may pump up the air supply even though the crane is in use. The compressor is shut down manually during truck travel to the location needing service. The truck is usually driven to a position beside the equipment to be serviced and once in position, the truck engine is allowed to idle with the compressor manually returned to automatic control. Thereafter, compressed air is used as needed for both tool operation and for inflation.

The foregoing detailed description has been given for clearness of understanding only, and no unnecessary limitations should be understood therefrom, as some modifications may be obvious to those skilled in the art.

I claim:

1. An air compressor system for installation in a small truck for supplying compressed air for auxiliary use at least at rates of 16 c.f.m. of free air at 100 p.s.i., at approximately 1,000 r.p.m., comprising:
   a single stage piston type compressor with an overall height not exceeding twelve inches and a mounting platform having means for attachment to a truck engine and to the compressor to secure the compressor to such engine;
   a pulley drive and an electric clutch mounted on the compressor to receive belt drive from a truck engine driven pulley, said clutch being normally in disconnected position;
   a compressed air storage tank having means for mounting upon a truck body remote of the engine and an air output line connecting the compressor and storage tank;
   a check valve in said output line immediately adjacent said compressor;
   a pneumatic sensing control unit connected to the air output line adjacent said check valve on the storage tank side thereof, said control unit having high and low pressure manually adjustable settings operable by sensed storage tank air pressure to automatically activate and deactivate said electric clutch; and
   a manual electrical switch mounted in overriding control of said pneumatic sensing control preventing undesired activation of said electric clutch and compressor by said pneumatic sensing control at any r.p.m. excessive of about 1,000.

2. A system as specified in claim 1 wherein a mounting platform is provided for the compressor with arms on the platform having means for direct bolted connection to the truck engine, the compressor when secured to the platform being held thereby in fixed position relative to the truck engine.

3. A system as specified in claim 2 wherein the mounting platform has a generally horizontal bed plate with means for mounting the compressor in an upright position thereon and said arms extending from said bed plate to the truck engine and having an idler pulley secured thereto in position to tighten belt drive means from the engine to the compressor.

4. A system as specified in claim 1 wherein the compressor has at least 25 cubic feet per minute displacement at truck engine idle speed at approximately 1,000 r.p.m. whereby compressor air in quantity may be delivered for a sustained 10 minute period to an air driven tool requiring from 12 to 18 c.f.m. of free air at 100 p.s.i. for efficient operation.

5. A system as specified in claim 1 wherein the drive from the truck engine to the electric clutch for the compressor comprises belts and pulleys with a one-to-one ratio for running the compressor at revolutions per minute equal to truck engine revolutions per minute and not substantially above 1,000 r.p.m.

6. A system as specified in cliaim 1 wherein the compressor has at least four air compressing cylinders each discharging into a common manifold immediately ahead of said check valve in the direction of compressed air flow from the compressor to said storage tank.

7. A system as specified in claim 6 wherein the cylinders are arranged in two banks in a V-configuration, two cylinders to a bank with each piston and cylinder having a displacement of approximately 4.91 cubic inches per stroke.

References Cited

UNITED STATES PATENTS

| | | | |
|---|---|---|---|
| 1,846,655 | 2/1932 | Rayfield | 230—187 |
| 1,993,583 | 3/1935 | Arena | 230—15 |
| 2,009,001 | 7/1935 | Peterson | 103—23 X |
| 2,074,738 | 3/1937 | Aikman | 230—15 |
| 2,136,339 | 11/1938 | Halleck | 230—187 |
| 2,146,102 | 2/1939 | Wiegand | 230—15 |
| 2,317,135 | 4/1943 | Crittenden et al. | 230—15 |
| 2,639,083 | 5/1953 | Rambo | 230—15 X |

WILLIAM L. FREEH, Primary Examiner

U.S. Cl. X.R.

230—17